US011356382B1

(12) United States Patent
Goyal et al.

(10) Patent No.: US 11,356,382 B1
(45) Date of Patent: Jun. 7, 2022

(54) PROTECTING INTEGRATION BETWEEN RESOURCES OF DIFFERENT SERVICES USING SERVICE-GENERATED DEPENDENCY TAGS

(71) Applicant: Amazon Technologies, Inc., Seattle, WA (US)

(72) Inventors: Nitish Goyal, Karnataka (IN); Murali Panayadka Krishna, Karnataka (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/039,941

(22) Filed: Sep. 30, 2020

(51) Int. Cl.
*H04L 47/72* (2022.01)
*H04L 47/765* (2022.01)
*H04L 41/0893* (2022.01)
*H04L 47/74* (2022.01)
*H04L 47/78* (2022.01)

(52) U.S. Cl.
CPC .......... *H04L 47/72* (2013.01); *H04L 41/0893* (2013.01); *H04L 47/743* (2013.01); *H04L 47/765* (2013.01); *H04L 47/781* (2013.01)

(58) Field of Classification Search
CPC ... H04L 47/72; H04L 41/0893; H04L 47/743; H04L 47/765; H04L 47/781
See application file for complete search history.

(56) References Cited

U.S. PATENT DOCUMENTS

| | | | |
|---|---|---|---|
| 6,847,970 B2 | 1/2005 | Keller et al. | |
| 8,447,829 B1 * | 5/2013 | Geller | H04L 9/3239 709/217 |
| 8,732,800 B1 * | 5/2014 | Askew | G06Q 10/10 726/4 |
| 8,996,482 B1 * | 3/2015 | Singh | G06F 16/27 707/698 |
| 9,069,599 B2 | 6/2015 | Martinez et al. | |
| 9,112,777 B1 * | 8/2015 | Barclay | H04L 41/0893 |
| 9,413,678 B1 * | 8/2016 | Geller | H04L 9/3239 |
| 9,854,001 B1 * | 12/2017 | Roth | H04L 63/20 |
| 9,882,775 B1 * | 1/2018 | Allen | H04L 41/0873 |
| 10,116,581 B2 * | 10/2018 | Geller | G06F 21/6218 |
| 10,116,732 B1 * | 10/2018 | Canton | H04L 41/0813 |
| 10,496,692 B1 * | 12/2019 | Kahrs | G06F 16/955 |
| 10,642,698 B1 * | 5/2020 | Chopra | G06F 9/5077 |
| 10,721,141 B1 * | 7/2020 | Verma | G06F 11/3006 |
| 10,805,188 B2 * | 10/2020 | Arora | G06F 11/30 |

(Continued)

*Primary Examiner* — Jerry B Dennison
(74) *Attorney, Agent, or Firm* — Robert C. Kowert; Kowert, Hood, Munyon, Rankin & Goetzel, P.C.

(57) ABSTRACT

A resource tag service of a provider network may be used to protect integration between resources of different services by generating dependency tags. When a service receives, from a client, a request for a resource of the service to use another resource of another service, a dependency tag is generated by the resource tag service. The dependency tag indicates that the resource depends on the other resource (e.g., the resources are integrated). When the other service receives, from the client, a request to delete or modify the other resource, the deletion or modification of the other resource is prevented based on the existence of the dependency tag for the other resource (e.g., the dependency tag is attached to the other resource, indicating that the other resource of the other service is integrated with the resource of the service).

20 Claims, 8 Drawing Sheets

(56) References Cited

U.S. PATENT DOCUMENTS

| | | | |
|---|---|---|---|
| 10,805,227 B2* | 10/2020 | Geller | G06F 21/6218 |
| 10,958,654 B1* | 3/2021 | Relan | G06F 9/45558 |
| 10,997,198 B2* | 5/2021 | Avery | G06F 16/27 |
| 11,070,644 B1* | 7/2021 | Teng | H04L 67/306 |
| 2004/0064458 A1* | 4/2004 | Hagarty | G06F 16/252 |
| 2004/0068757 A1* | 4/2004 | Heredia | H04L 9/3247 |
| | | | 725/135 |
| 2006/0004755 A1* | 1/2006 | Basu | G06F 16/9574 |
| 2007/0294668 A1* | 12/2007 | Mohindra | G06F 9/5038 |
| | | | 717/120 |
| 2011/0179173 A1* | 7/2011 | Colrain | G06F 9/5061 |
| | | | 709/226 |
| 2012/0260303 A1* | 10/2012 | Wollnik | G06F 21/6218 |
| | | | 726/1 |
| 2013/0185715 A1* | 7/2013 | Dunning | G06F 9/45558 |
| | | | 718/1 |
| 2016/0173406 A1* | 6/2016 | Geller | G06F 9/468 |
| | | | 709/225 |
| 2017/0093753 A1* | 3/2017 | Summers | H04L 47/72 |
| 2018/0088964 A1* | 3/2018 | Hussain | G06F 9/4405 |
| 2018/0089250 A1* | 3/2018 | Collins | G06F 16/211 |
| 2018/0089299 A1* | 3/2018 | Collins | G06F 16/282 |
| 2018/0143855 A1* | 5/2018 | Kim | G06F 9/505 |
| 2018/0248774 A1* | 8/2018 | Arora | G06F 11/30 |
| 2019/0068518 A1* | 2/2019 | Geller | H04L 47/70 |
| 2020/0007455 A1* | 1/2020 | Chhabra | G06F 21/6218 |
| 2020/0186571 A1* | 6/2020 | Lynk | H04L 63/20 |
| 2021/0165694 A1* | 6/2021 | Nabi | G06F 11/1433 |
| 2021/0208934 A1* | 7/2021 | Jadhav | G06F 8/60 |
| 2021/0211356 A1* | 7/2021 | Gati | H04L 43/08 |

* cited by examiner

US 11,356,382 B1

PROTECTING INTEGRATION BETWEEN RESOURCES OF DIFFERENT SERVICES USING SERVICE-GENERATED DEPENDENCY TAGS

BACKGROUND

Many companies, developers, and other entities use a remote provider network of a service provider (e.g., a "cloud-based" infrastructure) to run various computing applications. For example, a developer may create a database table using a database service of the provider network and send temperature data from temperature sensors to the provider network for storage at the database table. In this case, the database table may be considered a resource of the database service that was created for use by the client. To increase data security, the customer may create an encryption key using an encryption service and instruct the database service to use the encryption key of the encryption service for encryption and decryption of the table's data. In this case, the table depends on the encryption key to encrypt or decrypt data. Therefore, a resource of the database service (the table) depends on another resource of another service (the encryption key). Many other type of resource dependencies may exist. For example, a user login process for a content search service may need to retrieve certain user credentials that are managed by a credential management service in order to allow a user to access the content search service.

Many different types of resource dependencies may exist between services for a client. Therefore, many service integrations may be disrupted due to the client deleting or modifying resources that are depended on by other resources. For example, a client may instruct an encryption service to delete an encryption key that is used to encrypt a table of a database service. After deletion of the key, the client is unable to decrypt the table data because the key no longer exists. The number of service integration disruptions may continue to increase as a client adds new services and resources.

Figure 1:
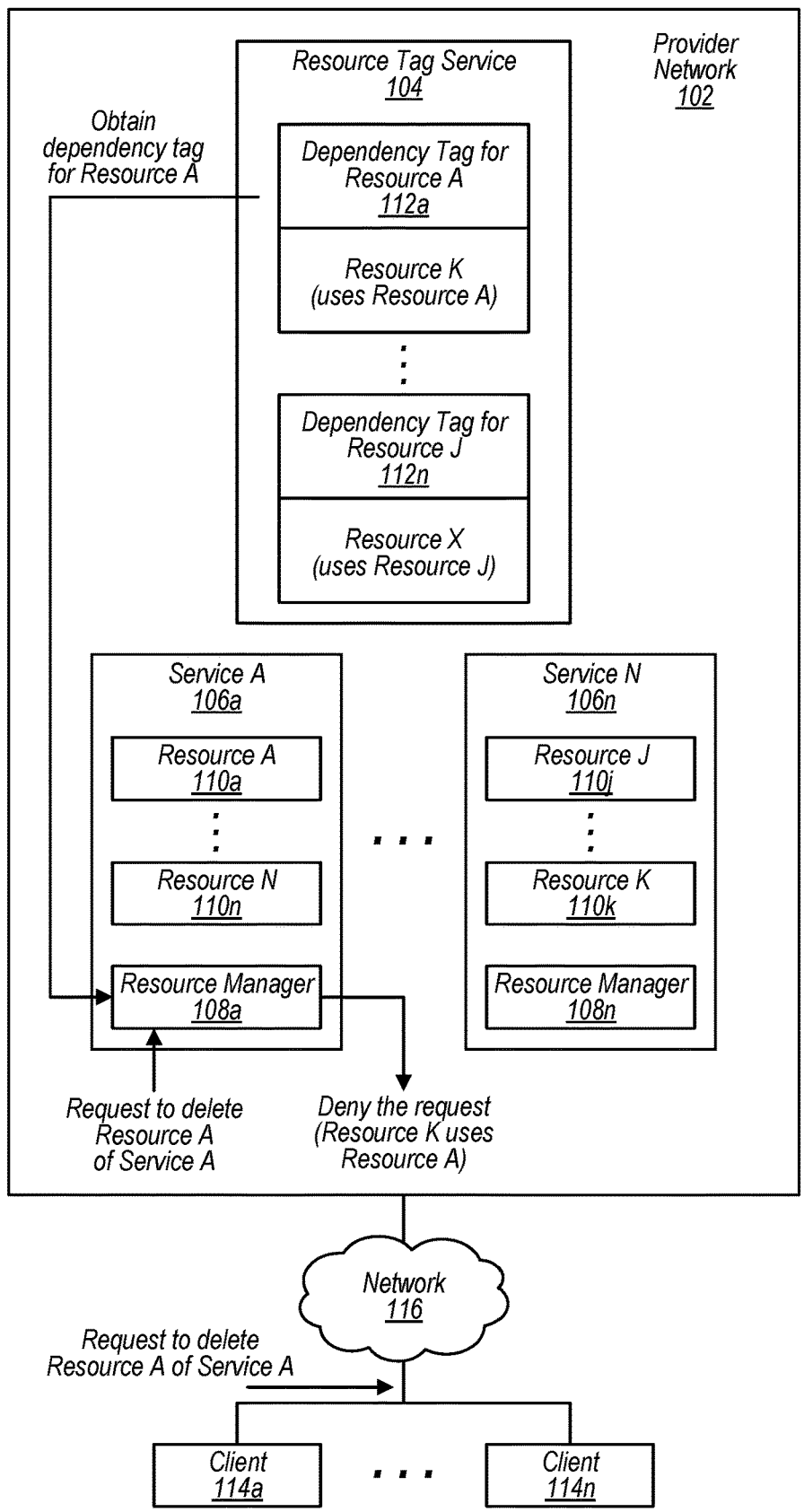
FIG. 1 is a logical block diagram illustrating a system for protecting integration between resources of different services using service-generated dependency tags, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to protect integration between resources of different services using service-generated dependency tags, according to some embodiments. In embodiments, a client of a service provider network may cause a resource of the service to use another resource of another service (e.g., resulting in an "integration" of use between the resource and the other resource). In embodiments, a dependency tag may be generated for the other resource of the other service. If the client attempts to use the other service to delete or modify the other resource, the deletion or the modification may be prevented based on the dependency tag. For example, if a key of a key management service is used to encrypt a table of a database service, the client may be prevented from using the key management service to delete the key because of the dependency tag that was generated for the key.

In embodiments, the dependency tags are service-generated and/or clients are unable to delete or modify them. For example, the database service may receive a request from the client for the database table to use the key of the key management service for encryption/decryption of data and in response, the database service may cause the dependency tag to be generated for the other resource. In embodiments, the database service may send a request to another service to generate and/or store the dependency tag (e.g., a resource tag service). By using service-generated dependency tags, service integration disruptions may be reduced or eliminated, even as a client continues to add new resources and/or new integrations between resources. Furthermore, the use of service-generated dependency tags may reduce or eliminate the need for a client to monitor and track various dependencies between resources and prevent integration disruptions. This may reduce the amount of hardware/software resources and/or system administrator resources that would otherwise be required to prevent integration disruptions.

Note that in some embodiments, a client policy may be applied that allows the client to delete and/or modify the dependency tag.

In various embodiments, the components illustrated in the figures may be implemented directly within computer hardware, as instructions directly or indirectly executable by computer hardware (e.g., a microprocessor or computer system), or using a combination of these techniques. For example, the components (e.g., services) of the figures may be implemented by a system that includes one or more compute nodes, in one embodiment, each of which may be similar to the computer system embodiment illustrated in FIG. 9 and described below (e.g., containing one or more processors and one or more memories).

This specification begins with a description of a system for protecting integration between resources of different services using service-generated dependency tags. A number of different methods and techniques to protect integration between resources of different services using service-generated dependency tags are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for protecting integration between resources of different services using service-generated dependency tags, according to some embodiments.

In the depicted embodiment, a provider network 102 includes a resource tag service 104 and any number of services 106 that may be used with the resource tag service 104 to protect integrations between resources of different services 106 (e.g., using service-generated dependency tags). As discussed herein, in various embodiments, any number of other services may be used in conjunction with the resource tag service 104 and/or any of the services 106 to protect integrations between resources of different services.

As depicted, each service 106 may include a resource manager 108 that manages any number of resources 110 of the service. The resource tag service 104 may include any number of dependency tags 112 for any number of resources 110 of services. As shown, dependency tag for resource A 112a includes information (e.g., metadata) indicating that resource K 110k uses resource A 110a (e.g., resource K 110k depends on resource A 110a). Similarly, the dependency tag for resource J 112n includes information (e.g., metadata) indicating that resource X (not shown) uses resource J 110j (e.g., resource X depends on resource J 110j).

In embodiments, a dependency tag for a resource may be any form of data and/or metadata that is attached/associated with the resource to indicate that another resource depends on the resource (e.g., is integrated with the resource and/or has the dependency relationship with the resource). In embodiments, the dependency tag identifies the other resource using a unique ID of the other resource (and may also identify the service that created/manages the other resource using a unique ID of the service).

As shown, any number of client networks 114 of different clients may be remotely located from the provider network 102 (e.g., as a local (private) network of the client separate from a local network of the provider network). Any number of devices within a given client may communicate with the provider network (or other networks) via a wide-area network 116 (e.g., the Internet).

In the depicted embodiment, a client (e.g., administrator or other user of the client) may send from the client network to service A 106a (e.g., via a graphical user interface and/or command line interface of a management device of the client network) a request to delete Resource A 110a. As shown, the request is routed to the resource manager 108a of service A 106a. In embodiments, the request may be received at an interface (e.g., application programming interface (API)) of service A 106a.

In response to receiving the request to delete Resource A, the resource manager 114a may obtain, from the tag service 104, the dependency tag for Resource A. In some embodiments, the resource manager 114a may first determine whether a dependency tag exists for Resource A and if not, the resource manager 114a may allow the deletion. In embodiments, deletion and/or modification of Resource A would result in disruption of the integration between the Resource A and Resource K. Therefore, the dependency tag for Resource A exists (e.g., previously caused to be generated by Service N) and indicates Resource K uses Resource A.

In embodiments, the resource manager 114a may obtain the dependency tag for Resource A via an API of the resource tag service. For example, the resource manager 114a may request the dependency tag for Resource A via the API and the resource tag service may send, via the API, the dependency tag for Resource A to the resource manager 114a. In embodiments, if no dependency tag exists for Resource A, then the resource tag service may not return any response or may send a response that indicates no dependency tag exists for Resource A. In some embodiments, the resource manager 114a may obtain the dependency tag for Resource A from a data store (e.g., via a query to a database/memory maintained by the provider network and/or maintained by Service A itself). In various embodiments, any suitable technique may be used to obtain the dependency tag for Resource A from any suitable storage location.

In embodiments, Service A causes the deletion of the Resource A to be prevented, wherein the deletion of Resource A is prevented based at least on the dependency tag. As described for FIG. 3, to cause the deletion of the Resource A to be prevented, Service A may send the dependency tag and client credentials to another service. In some embodiments, Service A itself may prevent deletion of Resource A based on a policy of the client and the dependency tag. For example, the policy of the client may be to prevent deletion of any resource of Service A that has a dependency tag (e.g., has a tag attached/associated with the resource, indicating that another resource of another resource depends on the resource).

In some embodiments, the policy of the client may be more specific. For example, the policy may be to prevent deletion of only certain types or categories/groups of resources of Service A. Therefore, if Resource A belongs to a particular category of resource and has a dependency tag, deletion may be prevented; otherwise, deletion will not be prevented. As another example, the policy of the client may be to prevent deletion of a resource that has a dependency tag if the other resource that depends on the resource is a certain type of resource or belongs to a particular category/group/service; otherwise, deletion will not be prevented. In embodiments, any other suitable client-specific policy may be applied to limit the prevention of deletion of resources that have dependency tags.

In embodiments, based on the prevention of the deletion of Resource A, Service A sends a message/indication to the client 114a indicating that deletion of Resource A was prevented. In embodiments, Service A may send a message/ indication that indicates the other resource identified by the dependency tag (e.g., the other resource that depends on Resource A).

In some embodiments, the client may be warned that another resource depends on the resource to be deleted/ modified and the client may be given the option to delete/ modify the resource anyway (e.g., based on a client-specific policy to allow deletion after a warning message). For example, after Service A prevents deletion of Resource A based on Resource A's dependency tag, Service A may send to the client a message indicating the integration between Resource A and Resource K. The client may then confirm they want to delete/modify Resource A by sending another confirmation request to Service A to delete/modify Resource A. In response to receiving the confirmation request, Service A may delete/modify Resource A.

In various embodiments, a request to modify a resource may be handled in the same way as described herein for a request to delete a resource. For example, a client-requested modification of Resource A may be prevented based on the dependency tag for Resource A in the same way that the deletion of Resource A may be prevented based on the dependency tag for Resource A. In some embodiments, Service A may determine that a client-requested modification to Resource A will not disrupt the integration between Resource A and Service K and therefore, Service A will not prevent modification of Resource A, even though Resource A has a dependency tag.

Figure 2:
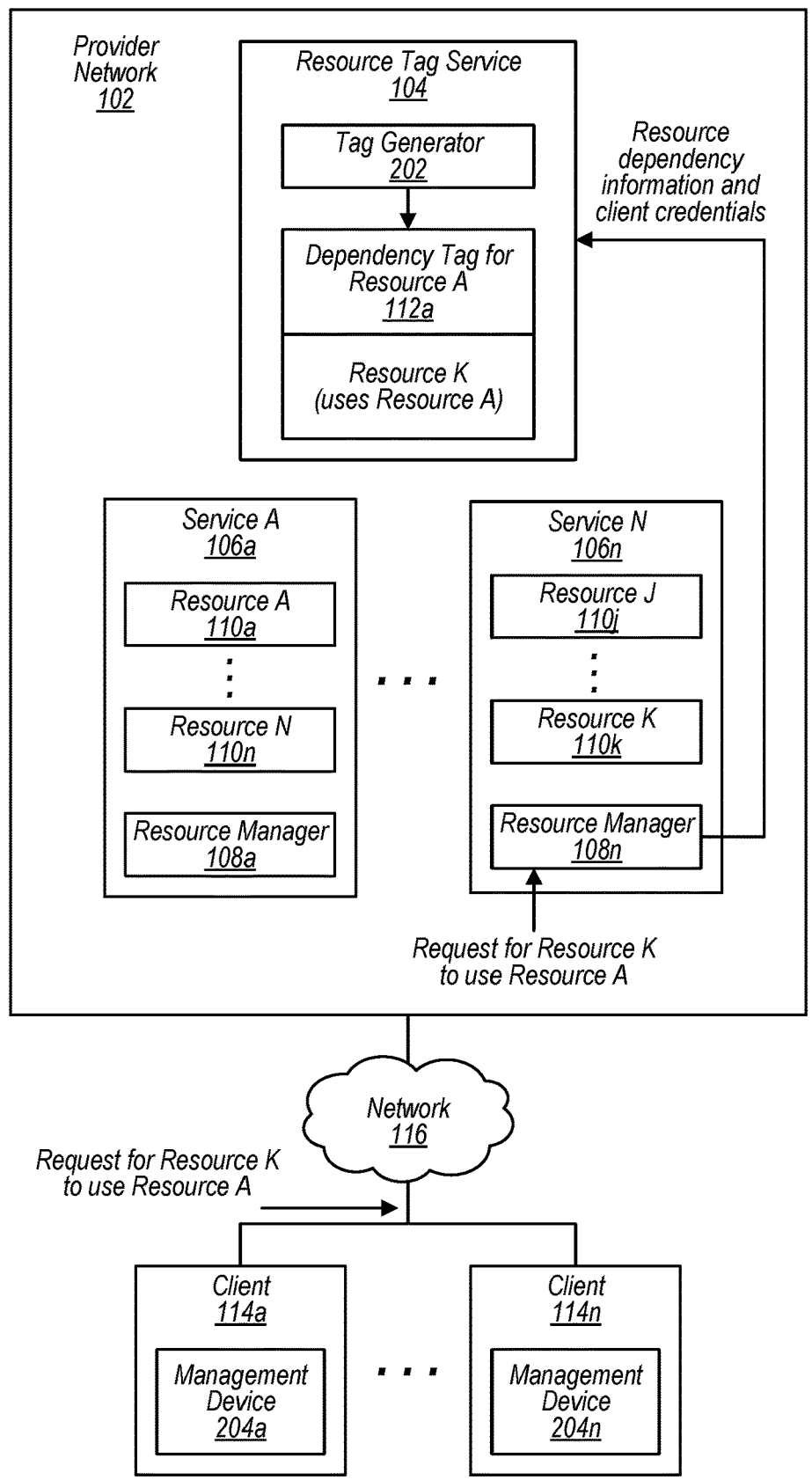
FIG. 2 is a logical block diagram illustrating generation of a dependency tag in a system for protecting integration between resources of different services using service-generated dependency tags, according to some embodiments.

FIG. 2 is a logical block diagram illustrating generation of a dependency tag in a system for protecting integration between resources of different services using service-generated dependency tags, according to some embodiments.

In embodiments, the resource tag service 104 includes a tag generator 202 that may generate any number of tags for any number of resources of any number of services of the provider network. As shown, a client sends a request from the client network 114a (via a graphical user interface and/or command line interface of a management device 204a of the client network 114a) to service N 106n for Resource K to use Resource A. For example, Resource K may be a table and Resource A may be an encryption key that the client wishes to use to encrypt/decrypt data of the table (resulting in an integration between Resource K and Resource A).

The resource manager 108n may receive the request (e.g., via an API of service N) from the client 114. Based on the request and/or based on the resulting integration of Resource K and Resource A, the service N causes a dependency tag 112a to be generated for Resource A. In embodiments, the tag identifies Resource K as the resource that uses Resource A. In some embodiments, if a resource that depends on another resource is deleted and/or no longer depends on the other resource, then the dependency tag that was previously generated for the other resource is automatically deleted in response (e.g., deleted by the service that manages the resource and/or by the resource tag service in response to determining, by the service and/or resource tag service, that the resource was deleted and/or no longer depends on the other resource). Using the above example, if the table (Resource K) is deleted and/or no longer uses the encryption key (Resource A), then in response, service N may cause the dependency tag 112a to be deleted (e.g., service N may send a request to delete the dependency tag 112a to the resource tag service 104 and in response to receiving the request, the resource tag service 104 deletes the dependency tag 112a). This allows the service(s) to automatically delete tags for particular resources that are no longer depended on by other resources, which in turn allows those particular resources to be deleted or modified (e.g., allowing the deletion or modification of resource A, since there is no longer a dependency tag for resource A).

In the depicted embodiment, to cause the dependency tag to be generated for Resource A, service N sends a request to generate the dependency tag to the resource tag service 104. In response to receiving the request, the resource tag service generates and/or stores the dependency tag for Resource A. In embodiments, the request may indicate that Resource K uses Resource A. In some embodiments, the request may include credentials of the client. The resource tag service may use the credentials to authorize the creation/generation of the resource tag for Resource A. The resource tag service may use the credentials to include a unique identifier of the client as part of the tag metadata, which may be used by service A to verify that the tag was generated for the client and/or the client's Resource A.

As shown, the request may include any suitable information describing the resource dependency, which may be used by Service A to determine whether or not to prevent deletion or modification of Resource A. For example, a type of integration may be included as part of the tag metadata because the client-specified policy for Service A may prevent deletion or modification of resources that are part of some types of integrations (e.g., integrations that use test resources) but allow deletion or modification of resources that are part of other types of integrations (e.g., integrations that use production resources). In embodiments, service N may send a message to the client indicating that the integration was successful. In some embodiments, service N may send a message to the client indicating that a dependency tag was created for Resource A.

Figure 3:
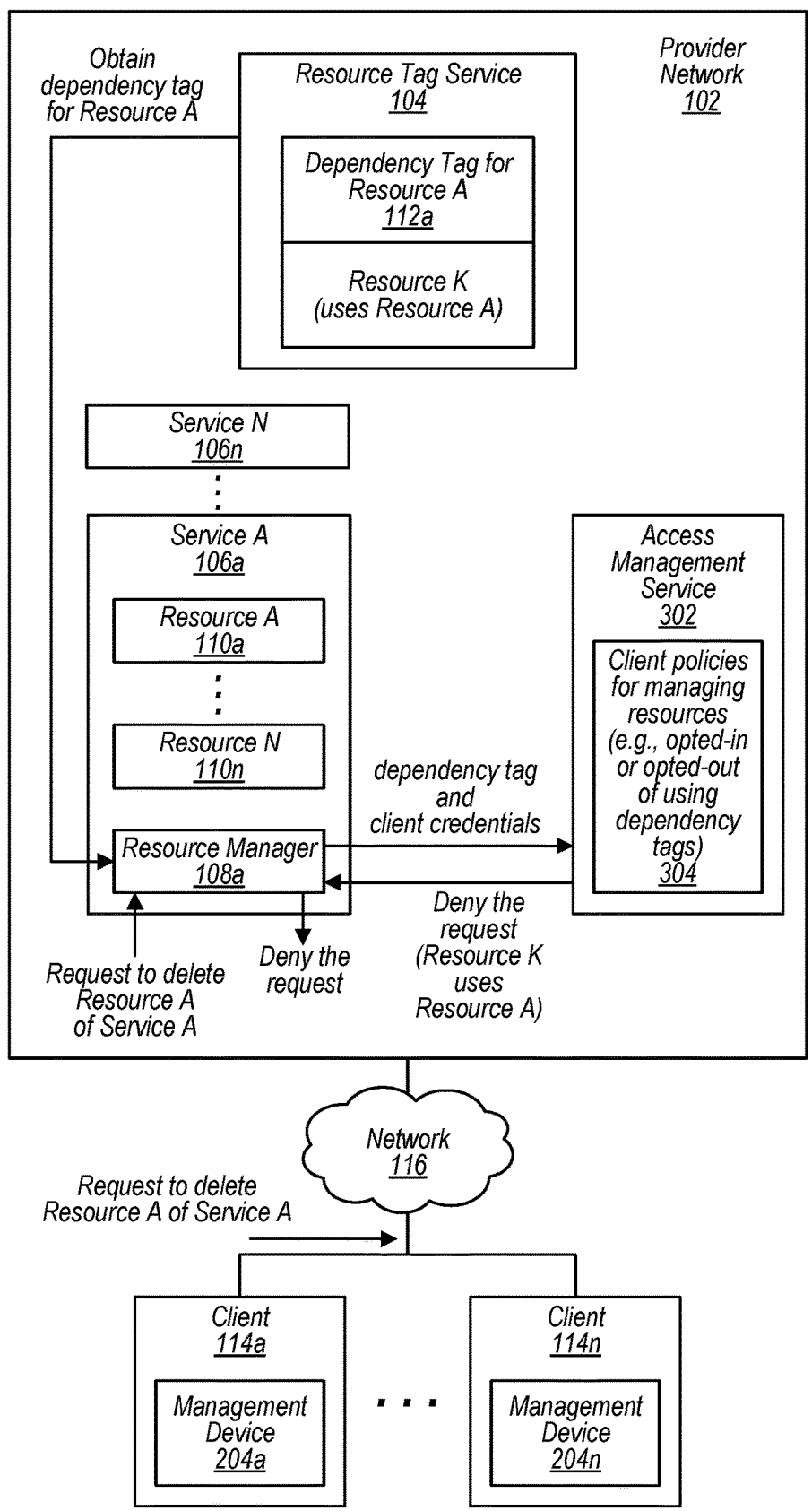
FIG. 3 is a logical block diagram illustrating preventing deletion of a resource in a system for protecting integration between resources of different services using service-generated dependency tags, according to some embodiments.

FIG. 3 is a logical block diagram illustrating preventing deletion of a resource in a system for protecting integration between resources of different services using service-generated dependency tags, according to some embodiments.

In embodiments, the resource tag service 104 includes an access management service 302 that may include client policies 304 of any number of clients. A give client may configure and apply one or more policies using the access management service 302 and/or using a service 106 (e.g., via sending a request to a service's API). A given client policy for managing resources may indicate whether the client has opted-in or opted-out of using dependency tags to prevent deletion and/or modification of service resources of the client (e.g., any service resources created by and/or used by the client).

In embodiments, the client policy may apply to any number of services that are used by the client (or all services used by the client). In some embodiments, a given client may apply any number of different policies for any number of different services. For example, a client may opt-in to use dependency tags for resources of some services and opt-out of using dependency tags for resources of other services. In embodiments, any of the policies discussed herein may be applied by a client to any services used by the client.

In the depicted embodiment, a client (e.g., administrator or other user of the client) may send from the client network to service A 106a (e.g., via a graphical user interface and/or command line interface of a management device 204a of the client network 114a) a request to delete Resource A 110a. As shown, the request is routed to the resource manager 108a of service A 106a. In embodiments, the request may be received at an interface (e.g., application programming interface (API)) of service A 106a.

In response to receiving the request to delete Resource A, the resource manager 114*a* may obtain, from the tag service 104, the dependency tag for Resource A. In embodiments, deletion and/or modification of Resource A would result in disruption of the integration between the Resource A and Resource K. Therefore, the dependency tag for Resource A exists and indicates Resource K uses Resource A.

In embodiments, the resource manager 114*a* may obtain the dependency tag for Resource A via an API of the resource tag service. For example, the resource manager 114*a* may request the dependency tag for Resource A via the API and the resource tag service may send, via the API, the dependency tag for Resource A to the resource manager 114*a*.

Service A causes the deletion of the Resource A to be prevented, wherein the deletion of Resource A is prevented based at least on the dependency tag. In the depicted embodiment, in order to cause the deletion of the Resource A to be prevented, Service A sends the dependency tag and client credentials to the access management service 302.

In embodiments, the access management service 302 determines a policy associated with Resource A. To do so, the access management service 302 may authenticate, authorize, and/or identify the client based on the client credentials in order to identify the policy that is currently applied for resources of service A (or for the type of resource that Resource A is classified as). The access management service 302 may then determine whether the policy indicates that deletion or modification is to be prevented. In the example embodiment, the access management service 302 determines that the policy is to prevent resources of service A from being deleted if they have a dependency tag (e.g., a tag indicating another resource of another service depends on a resource of service A). Therefore, the access management service 302 prevents deletion of Resource A.

In embodiments, based on the prevention of the deletion of Resource A, the access management service 302 sends a message/indication to the client 114*a* indicating that deletion of Resource A was prevented. In embodiments, the access management service 302 may send a message/indication that indicates the other resource identified by the dependency tag (e.g., the other resource that depends on Resource A).

In some embodiments, the client may be warned that another resource depends on the resource to be deleted/modified and the client may be given the option to delete/modify the resource anyway (e.g., based on a client-specific policy to allow deletion after a warning message). For example, after the access management service 302 prevents deletion of Resource A based on Resource A's dependency tag, the access management service 302 may send to the client a message indicating the integration between Resource A and Resource K. The client may then confirm they want to delete/modify Resource A by sending another confirmation request to Service A (or the access management service 302) to delete/modify Resource A. In response to receiving the confirmation request, Service A (or the access management service 302) may delete/modify Resource A. Therefore, in various embodiments, the access management service 302 or the resource manager may deny the request and/or send a message to the client indicating that the request was denied.

In embodiments, the access management service 302 may receive configuration requests from a client in order to apply one or more policies for one or more services used by the client. For example, the access management service may receive a request from the client to apply a particular policy to prevent subsequent deletion or modification of given resources of the service (or any number of services used by the client or all services used by the client). In response to the receiving the request from the client, the access management service may then apply the policy to the service(s). Note that in some embodiments, some or all of the functionality described for the resource tag service and/or the access management service may instead be performed by the services 106 themselves.

Figure 4:
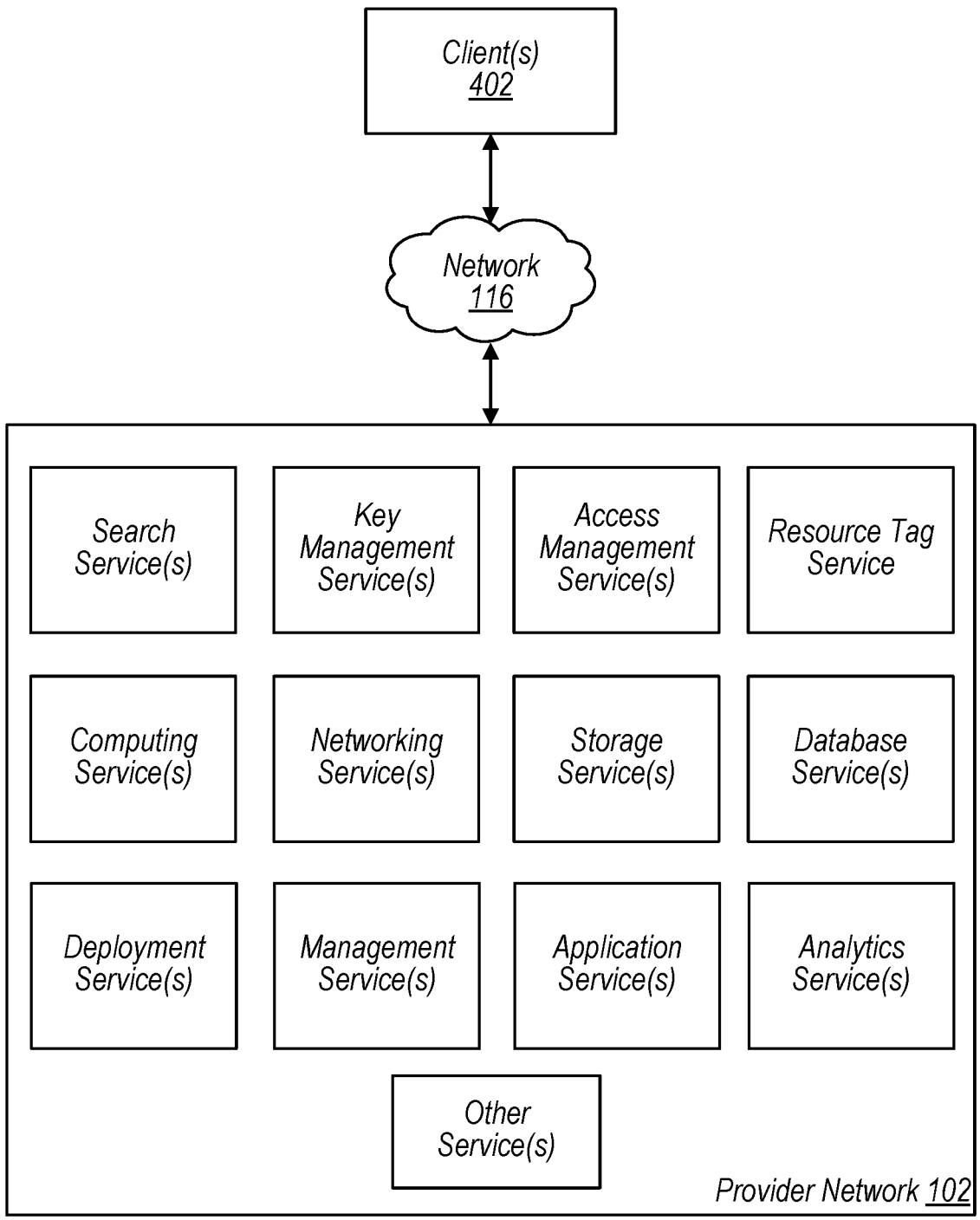
FIG. 4 is an illustration of different services that may be used in a system for protecting integration between resources of different services using service-generated dependency tags, according to some embodiments.

FIG. 4 is an illustration of different services that may be used in a system for protecting integration between resources of different services using service-generated dependency tags, according to some embodiments.

In the depicted embodiment, any number of clients 402 may use any number of services of the client (e.g., using a computing device of a remote client network). In embodiments, any resource(s) of any given service described below may be depended on by any other resource of any other given service described below (e.g., integrated). In embodiments, the provider network 102 may be set up by an entity such as a company or a public sector organization to provide one or more network-based services (such as various types of cloud-based computing or storage) accessible via the Internet and/or other networks to the clients 402. In embodiments, the provider network may include numerous data centers hosting various resource pools, such as collections of physical and/or virtualized computer servers, storage devices, networking equipment and the like, needed to implement and distribute the infrastructure and services offered by the provider network.

The provider network 102 may implement many different kinds of services, and thus the following discussion of various services is not intended to be limiting. As shown, any number of other services may be implemented by the provider network. In the depicted example, various network-based services may be implemented such as deployment service(s), management service(s), application service(s), analytic service(s), and storage service(s). Storage service(s) may be one or more different types of services that provide different types of storage. For example, storage service(s) may be an object or key-value data store that provides highly durable storage for large amounts of data organized as data objects. In some embodiments, storage service(s) may provide virtual block storage for other computing devices, such as compute instances implemented as part of a virtual computing service. For example, a virtual block-based storage service may provide block level storage for storing one or more data volumes mapped to particular clients, providing virtual block-based storage (e.g., hard disk storage or other persistent storage) as a contiguous set of logical blocks. Storage service(s) may replicate stored data across multiple different locations, fault tolerant or availability zones, or nodes in order to provide redundancy for durability and availability for access.

In some embodiments, provider network may implement database service(s). Database services may include many different types of databases and/or database schemes. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

The provider network may implement networking service(s) in some embodiments. Networking service(s) may configure or provide virtual networks, such as virtual private networks (VPNs), among resources implemented in the provider network as well as control access with external systems or devices. For example, networking service(s) may be configured to implement security groups for compute instances in a virtual network. Security groups may enforce one or more network traffic policies for network traffic at members of the security group.

Networking service(s) may manage or configure the internal network for provider network (e.g., for use by a particular client). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients may be attached to the overlay network so that when a client provides an IP address that they want to send packets to, the IP address is run in virtual space by communicating with a mapping service (or other component or service not illustrated) that knows where the IP overlay addresses are.

In some embodiments, the provider network may implement a virtual computing service to provide computing resources. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like.

In embodiments, compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications, without for example requiring the client to access an instance.

As shown, the provider network may implement a search service. In some embodiments, the search service may be a managed, scalable, and secure search service that provides clients a convenient way to search and analyze data (e.g., logs) and obtain real-time analytics based on the data analysis. In embodiments, a user login process for the search service may need to retrieve certain user credentials that are managed by a credential management service (e.g., a type of access management service) in order to allow a user to access the search service. Therefore, the user login process may be dependent on the credential management service. Similarly, any other type of service described herein may include the same type of resource dependency/integration to logging into the service.

The provider network may also implement a key management service. The key management service may be used to generate and/or maintain encryption keys on behalf of clients in order to secure data stored at the provider network. For example, a developer may create a database table using a database service of the provider network and send temperature data from temperature sensors (at the client site) to the provider network for storage at the database table. To increase data security, the customer may create an encryption key using an encryption service and instruct the database service to use the encryption key of the encryption service for encryption and decryption of the table's data. In this case, the table (resource) depends on the encryption key (another resource) to encrypt or decrypt data.

In at least some embodiments the provider network implements a resource tag service 104, as discussed with regard to FIGS. 1-3. The resource tag service may generate, store, and provide dependency tags, which are maintained for resources implemented at different network-based services. Embodiments may also implement an access management service 302, as discussed with regard to FIG. 3. The access management service 302 may prevent or allow deletion or modification of resources, based on client policies (e.g., opted-in or opted-out of using dependency tags).

In some embodiments, the provider network may implement another type of access management service for provider network resources, which performs user authentication and access control procedures. For example, for a given network-based service request to access a particular compute instance, the provider network may implement components configured to ascertain whether the client associated with the access is authorized to configure or perform the requested task. Authorization may be determined such by, for example, evaluating an identity, password or other credential against credentials associated with the resource(s), or evaluating the requested access to the provider network resource against an access control list for the particular resource. For example, if a client does not have sufficient credentials to access the resource, the request may be rejected, for example by returning a response to the requesting client indicating an error condition.

In addition to various dependencies that may exist between the resources of services shown, there are many other types of dependencies that may exist. For example, a domain name system (DNS) web service may route requests from end users to an internet application of an application service by translating a website name into a numeric IP address. Therefore, the internet application resource of the application service depends on the DNS web service. If a client resource of the DNS web service is deleted, it will disrupt the integration between the internet application resource and the client resource of the DNS web service because the internet application resource depends on the client resource of the DNS web service to translate the website name into a numeric IP address. As another example, a load balancer service may use a load balancing resource to distribute incoming traffic across multiple different compute instances. Therefore, the compute instances depend on the load balancing resource. If the load balancing resource is deleted, it will disrupt the integration between the compute instances and the compute instances because the compute instances depend on the load balancing resource to distribute the incoming traffic to them.

Network-based services implemented as part of provider network may each implement respective programmatic interfaces, in some embodiments. For example, requests directed to a virtual computing service may be formatted according to an API for virtual computing service, while requests to the storage service(s) may be formatted according to an API for the storage service(s). Different portions of the various APIs may be exposed to external clients, in some embodiments, with some other portions remaining available to internal clients, such as other network-based services in the provider network.

In some embodiments, the clients 402 may encompass any type of client configurable to submit requests to a network-based services platform (e.g., the provider network 102), in various embodiments. For example, a given client may include a suitable version of a web browser, or may include a plug-in module or other type of code module configured to execute as an extension to or within an execution environment provided by a web browser. In some embodiments, clients may include sufficient support to send the requests according to various programmatic interfaces for the service, as well as other supported protocols at the resources (e.g., Hypertext Transfer Protocol (HTTP)) for generating and processing network-based service requests without necessarily implementing full browser support.

Figure 5:
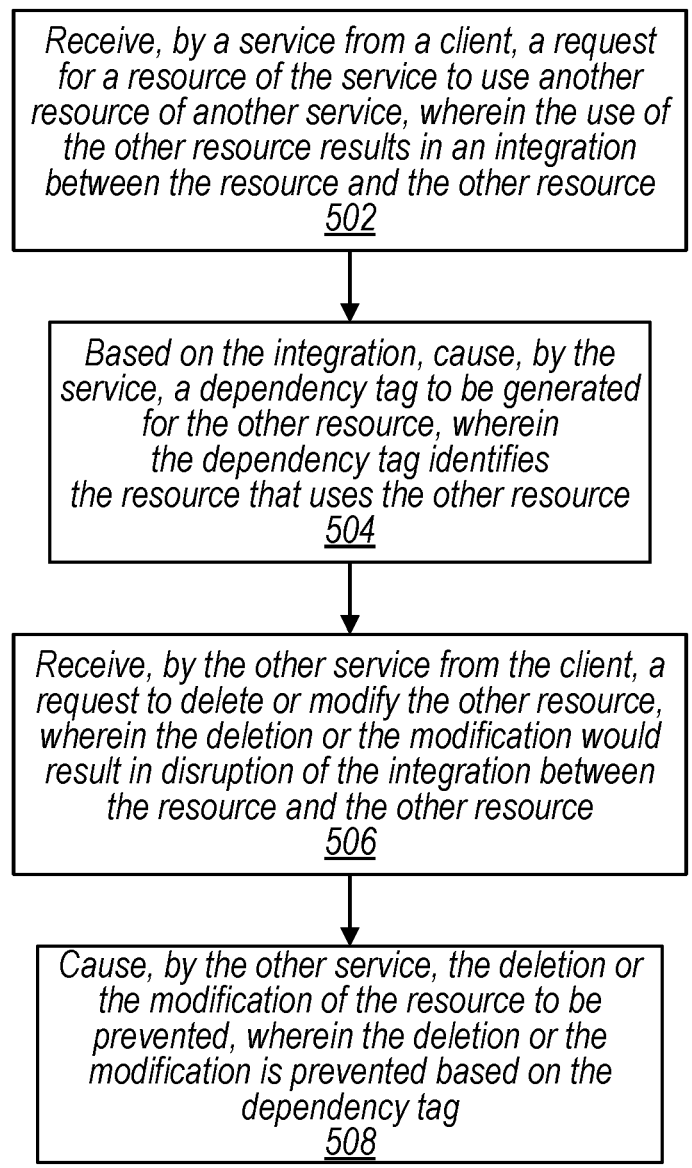
FIG. 5 is a high-level flowchart illustrating various methods and techniques to implement protecting integration between resources of different services using service-generated dependency tags, according to some embodiments.

FIG. 5 is a high-level flowchart illustrating various methods and techniques to implement protecting integration between resources of different services using service-generated dependency tags, according to some embodiments. These techniques, as well as the techniques discussed with regard to FIGS. 6 and 7, may be implemented using components or systems as described above with regard to FIGS. 1-4, as well as other types of components or systems, and thus the following discussion is not intended to be limiting as to the other types of systems that may implement the described techniques. For example, the techniques may be implemented by one or more of the services of a provider network.

As indicated at block 502, a service receives, from a client, a request for a resource of the service to use another resource of another service, wherein the use of the other resource results in an integration between the resource and the other resource. At block 504, based on the integration, the service causes a dependency tag to be generated for the other resource, wherein the dependency tag identifies the resource that uses the other resource.

At block 506, the other service receives, from the client, a request to delete or modify the other resource, wherein the deletion or the modification would result in disruption of the integration between the resource and the other resource. At block 508, the other service causes the deletion or the modification of the resource to be prevented (based on the dependency tag).

Figure 6:
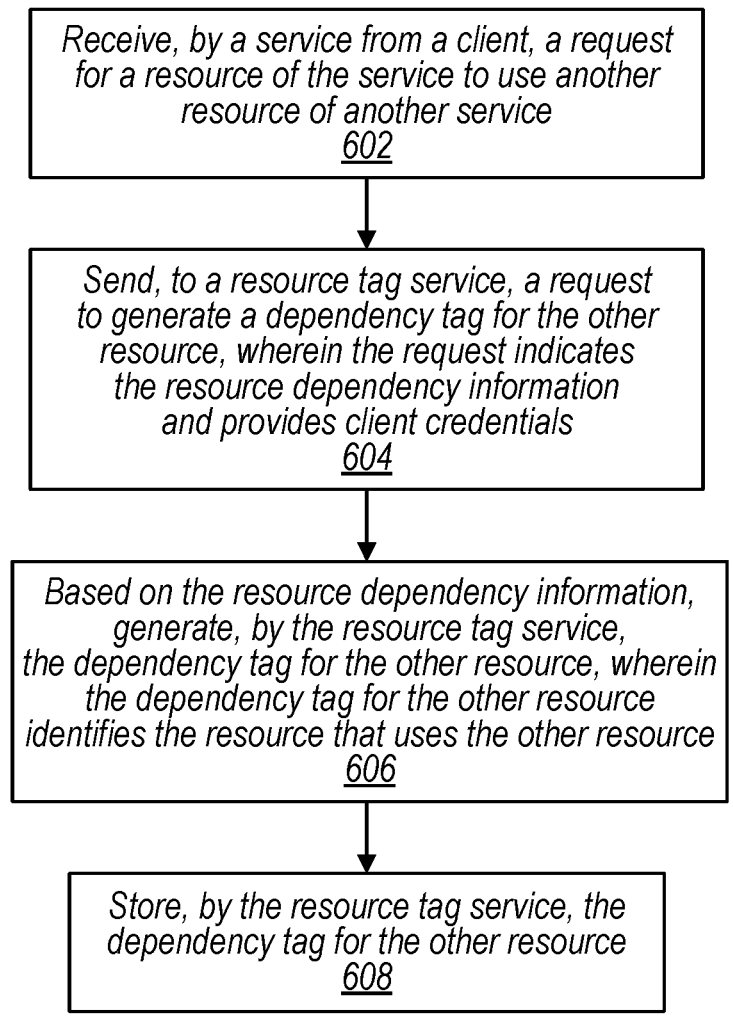
FIG. 6 is a high-level flowchart illustrating various methods and techniques to implement generation of a dependency tag in a system for protecting integration between resources of different services, according to some embodiments.

FIG. 6 is a high-level flowchart illustrating various methods and techniques to implement generation of a dependency tag in a system for protecting integration between resources of different services, according to some embodiments.

At block 602, a service receives, from a client, a request for a resource of the service to use another resource of another service. At block 604, the service sends, to a resource tag service, a request to generate a dependency tag for the other resource, wherein the request indicates the resource dependency information and provides client credentials.

At block 606, based on the resource dependency information, the resource tag service generates the dependency tag for the other resource, wherein the dependency tag for the other resource identifies the resource that uses the other resource. At block 608, the resource tag service stores the dependency tag for the other resource.

Figure 7:
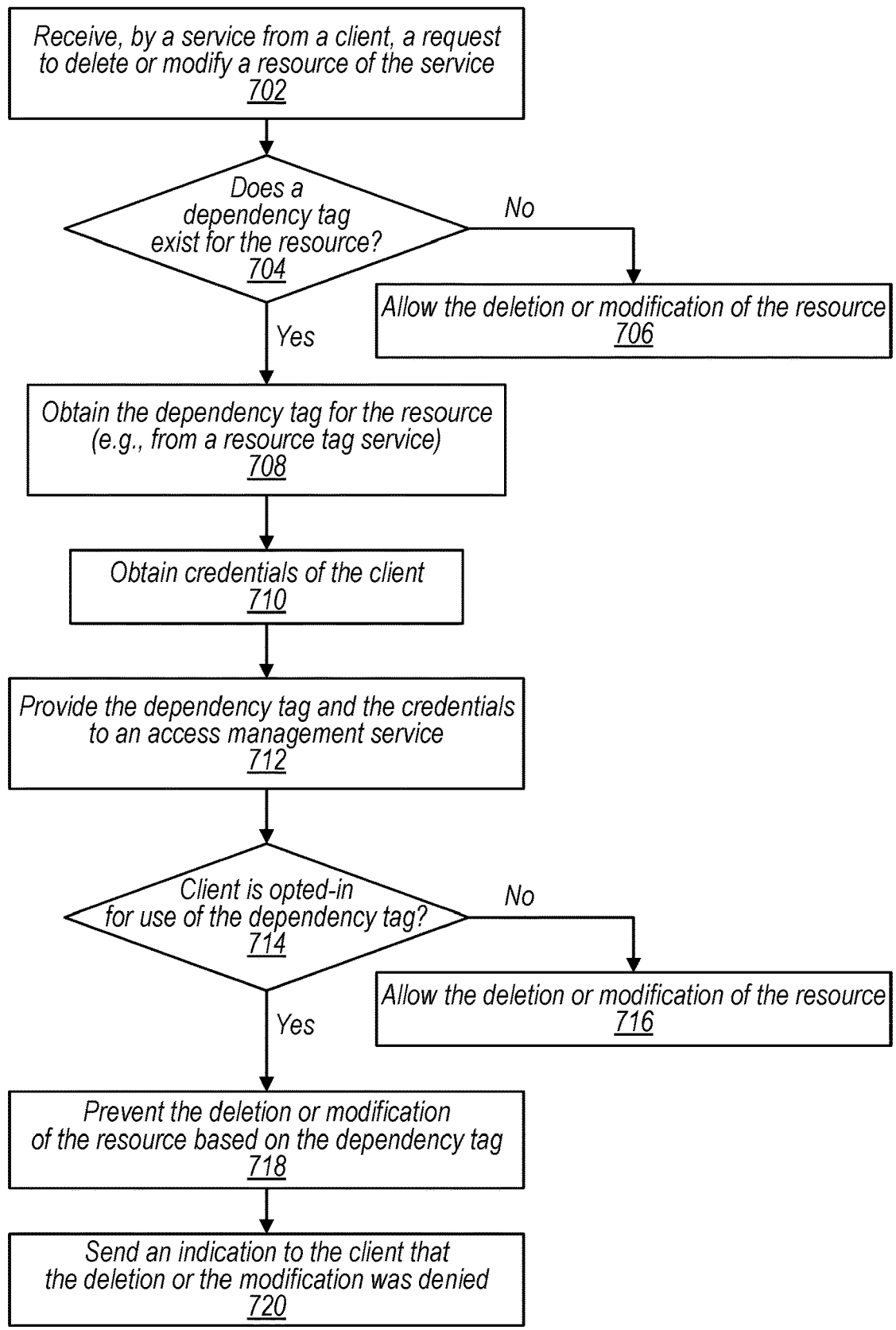
FIG. 7 is a high-level flowchart illustrating various methods and techniques to implement preventing deletion of a resource in a system for protecting integration between resources of different services, according to some embodiments.

FIG. 7 is a high-level flowchart illustrating various methods and techniques to implement preventing deletion of a resource in a system for protecting integration between resources of different services, according to some embodiments.

At block 702, a service receives from a client a request to delete or modify a resource of the service. At block 704, the service (or resource tag service) determines whether a dependency tag exists for the resource. If it does not exist, then at block 706, the service (or resource tag service) allows the deletion or modification of the resource.

Returning to block 708, if the dependency tag for the resource does exist, then at block 708, the service obtains the dependency tag for the resource (e.g., from the resource tag service or other location). At block 710, the service obtains credentials of the client (e.g., by accessing the credentials provided by the client to use the service). At block 712, the service provides the dependency tag and the credentials to an access management service. At block 714, the access management service determines whether the client is opted-in for use of the dependency tag. If the client is not opted-in, then at block 716, the access management service allows the deletion or modification of the resource.

Returning to block 714, if the access management service determines that the client is opted-in for use of the dependency tag, then at block 718, the access management service prevents the deletion or modification of the resource based on the dependency tag. At block 720, the access management service sends an indication to the client that the deletion or the modification was denied. In some embodiments, the access management service sends the indication to the service, which then sends the indication to the client. In some embodiments, the access management service sends an indication to the service that the deletion or modification of the resource is to be prevented and in response, the service prevents the deletion or modification of the resource.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of the various services and other components that implement the techniques described herein). The various methods as illustrated in the figures and described herein represent example embodiments of methods. The order of any method may be changed, and various elements may be added, reordered, combined, omitted, modified, etc.

Figure 8:
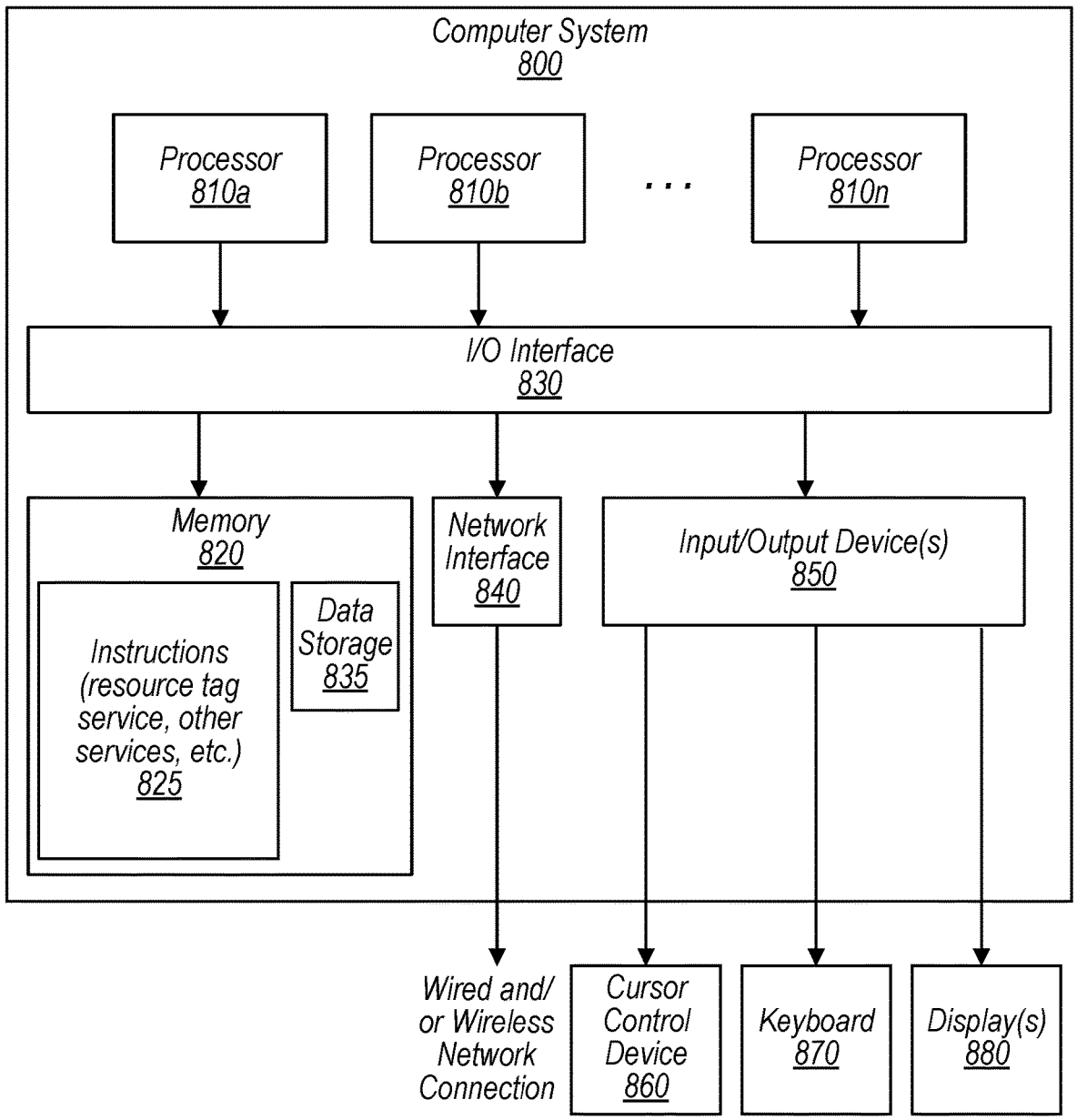
FIG. 8 is a block diagram illustrating an example computing system, according to some embodiments.

Embodiments to implement protecting integration between resources of different services using service-generated dependency tags as described herein may be executed on one or more computer systems, which may interact with various other systems or devices. One such computer system is illustrated by FIG. 8. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. Display(s) may include standard computer monitor(s) and/or other display systems, technologies or devices, in one embodiment. In some embodiments, it is contemplated that embodiments may be implemented using a single instance of computer system 800, while in other embodiments multiple such systems, or multiple nodes making up computer system 800, may host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions, in one embodiment. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 820 may store program instructions 825 and/or data accessible by processor 810, in one embodiment. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the resource tag service, other services, etc.) are shown stored within system memory 820 as program instructions 825 and data storage 835, respectively. In other embodiments, program instructions and/or data may be received, sent or stored upon different types of computer-accessible media or on similar media separate from system memory 820 or computer system 800. A computer-accessible medium may include non-transitory storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840, in one embodiment.

In one embodiment, I/O interface 830 may be coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may allow data to be exchanged between computer system 800 and other devices attached to a network, such as other computer systems, or between nodes of computer system 800, in one embodiment. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800, in one embodiment. Multiple input/output devices 850 may be present in computer system 800 or may be distributed on various nodes of computer system 800, in one embodiment. In some embodiments, similar input/output devices may be separate from computer system 800 and may interact with one or more nodes of computer system 800 through a wired or wireless connection, such as over network interface 840.

As shown in FIG. 8, memory 820 may include program instructions 825 that implement the various embodiments of the systems as described herein, and data store 835, comprising various data accessible by program instructions 825, in one embodiment. In one embodiment, program instructions 825 may include software elements of embodiments as described herein and as illustrated in the Figures. Data storage 835 may include data that may be used in embodiments (e.g., dependency tag, client policies, etc.). In other embodiments, other or different software elements and data may be included.

Those skilled in the art will appreciate that computer system 800 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 800 may be transmitted to computer system 800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of compute nodes implementing a plurality of different network-based services, wherein a plurality of respective resources are implemented at the plurality of different network-based services for a plurality of clients of the provider network;
a service of the plurality of different network-based services, configured to:
receive a request, from a client of the plurality of clients, for a resource of the service to use another resource of another service of the plurality of different network-based services, wherein the use of the other resource by the resource results in an integration between the resource and the other resource; and
based on the integration, cause a dependency tag to be generated for the other resource, wherein the dependency tag for the other resource identifies the resource that uses the other resource; and
the other service of the plurality of different network-based services, configured to:
receive a request, from the client, to delete or modify the other resource, wherein the deletion or the modification of the other resource would result in disruption of the integration between the resource and the other resource; and
cause the deletion or the modification of the other resource to be prevented, wherein the deletion or the modification of the other resource is prevented based at least on the dependency tag.

2. The system as recited in claim 1, wherein to cause the deletion or the modification of the other resource to be prevented, the other service is configured to:
obtain the dependency tag for the other resource;
obtain credentials of the client; and
provide the dependency tag and the credentials of the client to an access management service of the plurality of different network-based services, wherein the access management service is configured to:
determine, based on the credentials of the client, a policy associated with the other resource; and
based on the policy and the dependency tag, cause the deletion or the modification of the other resource to be prevented.

3. The system as recited in claim 2, wherein the access management service is configured to:
receive, from the client, a request to apply the policy to prevent subsequent deletion or modification of given resources of the other service; and
in response to the reception of the request, apply the policy to prevent subsequent deletion or modification of given resources of the other service.

4. The system as recited in claim 1, wherein to cause a dependency tag to be generated for the other resource, the service is configured to:
send a request to a resource tag service of the plurality of different network-based services, wherein the resource tag service is configured to:
based on the request and credentials of the client, generate the dependency tag for the other resource; and
store the dependency tag for the other resource.

5. The system as recited in claim 1, wherein the client is unable to delete or modify the dependency tag for the other resource.

6. A method, comprising:
performing, by one or more computing devices:
- receiving, at a service, a request from a client to delete or modify a resource of the service, wherein another resource of another service uses the resource, and wherein the use of the resource results in an integration between the resource and the other resource, and wherein the deletion or the modification of the resource would result in disruption of the integration between the resource and the other resource;
- obtaining, by the service, a dependency tag for the resource, wherein the dependency tag for the resource identifies the other resource that uses the resource; and
- causing, by the service, the deletion or the modification of the resource to be prevented, wherein the deletion or the modification of the resource is prevented based at least on the dependency tag.

7. The method as recited in claim 6, wherein causing the deletion or the modification of the resource to be prevented comprises:
- providing at least the dependency tag to an access management service;
- determining, by the access management service, a policy associated with the resource; and
- based on the policy and the dependency tag, causing, by the access management service, the deletion or the modification of the resource to be prevented.

8. The method as recited in claim 7, wherein determining the policy associated with the resource further comprises:
- determining, based at least on credentials for the client, the policy associated with the resource.

9. The method as recited in claim 7, further comprising:
- receiving, at the service or the access management service, a request from the client to apply the policy to prevent subsequent deletion or modification of given resources of the service; and
- in response to the reception of the request from the client, causing, by the service or the access management service, the policy to be applied.

10. The method as recited in claim 6, further comprising:
- providing, from the service to the client, an indication that the deletion or the modification of the resource was prevented.

11. The method as recited in claim 6, wherein the client is unable to delete or modify the dependency tag for the resource.

12. The method as recited in claim 6, further comprising:
- subsequent to the prevention of the deletion or the modification of the resource, providing, from the service to the client, an indication of the integration between the resource and the other resource;
- subsequent to providing the indication of the integration between the resource and the other resource, receiving, at the service, another request from the client to delete or modify the resource of the service; and
- in response to receiving the other request from the client to delete or modify the resource of the service, delete or modify the resource.

13. The method as recited in claim 6, further comprising:
- receiving, at the service, a request from another client to delete or modify another resource of the service, wherein a different resource of the other service uses the other resource of the service, and wherein the use of the other resource of the service results in an integration between the other resource of the service and the different resource, and wherein the deletion or the modification of the other resource of the service would result in disruption of the integration between the other resource of the service and the different resource;
- obtaining, by the service, another dependency tag for the other resource of the service, wherein the other dependency tag for the other resource of the service identifies the different resource that uses the other resource of the service; and
- causing, by the service, the deletion or the modification of the other resource of the service to be prevented, wherein the deletion or the modification of the other resource of the service is prevented based at least on the other dependency tag,
- and wherein the other client is unable to delete or modify the other dependency tag for the other resource of the service.

14. The method as recited in claim 13, wherein causing the deletion or the modification of the other resource of the service to be prevented comprises:
- providing at least the other dependency tag to the access management service;
- determining, by the access management service, another policy associated with the other resource of the service; and
- based on the other policy and the other dependency tag, causing the deletion or the modification of the other resource of the service to be prevented.

15. The method as recited in claim 6, further comprising:
- receiving, at the service from the client, a request for another resource of the service to use a resource of a different service, wherein the use of the other resource of the service by the resource of the different service results in an integration between the other resource of the service and the resource of the different service; and
- based on the integration, cause a dependency tag to be generated for the other resource of the service, wherein the dependency tag for the other resource of the service identifies the resource of the different service that uses the other resource of the service.

16. One or more non-transitory computer-accessible storage media storing program instructions that when executed on or across one or more processors implement a service to:
- receive, from a client, a request for a resource of the service to use another resource of another service, wherein the use of the other resource by the resource results in an integration between the resource and the other resource;
- based on the integration, cause a dependency tag to be generated for the other resource, wherein the dependency tag for the other resource identifies the resource that uses the other resource, and
- wherein deletion or modification of the other resource is prevented based at least on the dependency tag and a policy associated with the client.

17. The one or more storage media as recited in claim 16, wherein to cause a dependency tag to be generated for the other resource, the program instructions when executed on or across the one or more processors:
- send, to a resource tag service, a request to generate the dependency tag, wherein the resource tag service generates and stores the dependency tag for the other resource.

18. The one or more storage media as recited in claim 17, further comprising program instructions that when executed on or across the one or more processors implement the service to:

in response to deletion of the resource of the service, cause the dependency tag for the other resource to be deleted.

19. The one or more storage media as recited in claim 17, wherein the request comprises credentials of the client.

20. The one or more storage media as recited in claim 16, wherein the client is unable to delete or modify the dependency tag for the resource.

\* \* \* \* \*